July 13, 1937.  A. J. SAARINEN  2,086,740
REGISTER
Filed April 13, 1936  2 Sheets-Sheet 1

Inventor
Armas J. Saarinen

WITNESS
H. Woodard

Attorney

July 13, 1937.     A. J. SAARINEN     2,086,740
REGISTER
Filed April 13, 1936     2 Sheets-Sheet 2
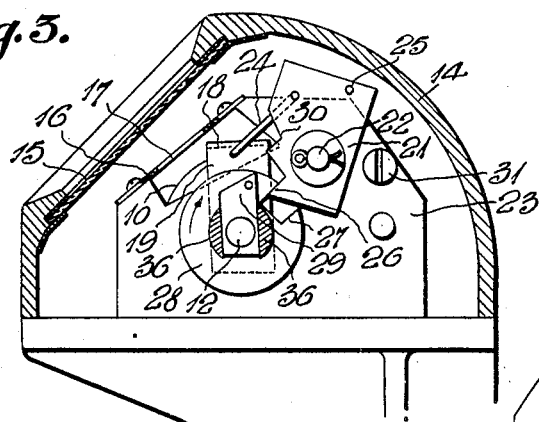
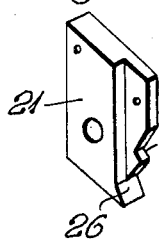
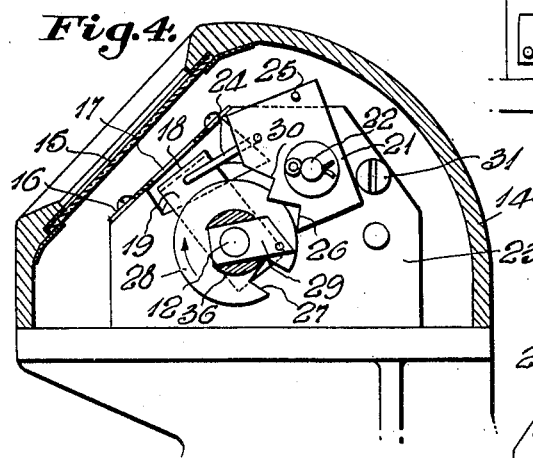
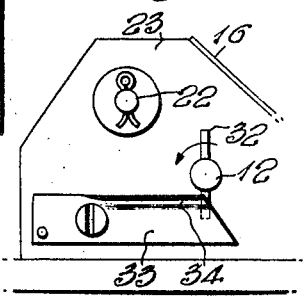
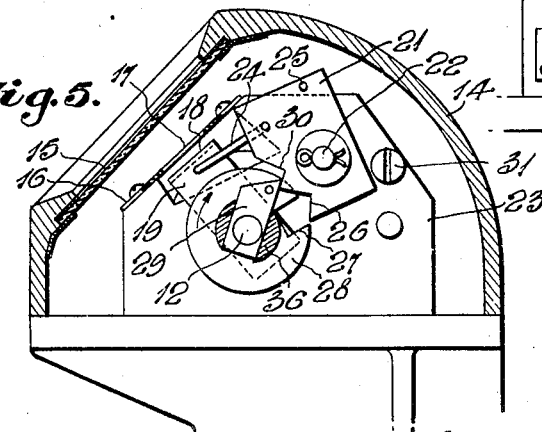
Inventor
Armas J. Saarinen
By
Attorney
WITNESS
H. Woodard Patented July 13, 1937

2,086,740

UNITED STATES PATENT OFFICE 2,086,740

REGISTER

Armas J. Saarinen, San Francisco, Calif., assignor to Granberg Meter Corporation, San Francisco, Calif., a corporation of California Application April 13, 1936, Serial No. 74,183

3 Claims. (Cl. 235—144)

The invention relates to registers used primarily with gasoline or oil meters for registering the quantity dispensed during any dispensing operation, the register being reset at zero after such operation. With regard to such registers, the National Conference on Weights and Measures at the Bureau of Standards in Washington, D. C., June, 1935, specified the following:

"34. *Return of indicating element to zero.*—Retail devices shall be so designed and constructed that the indicating elements used to tally sales and deliveries to individual purchasers or to indicate the amount delivered when any portion of the cycle or stroke has been completed, or the total price thereof, shall be returnable readily to a definite and clear zero indication before the next delivery is begun. Means shall be provided to prevent the indicating elements from being returned beyond the zero graduation. The indicating elements may be advanced only by the mechanical operation of the device itself: Provided, however, That the device may be cleared by advancing the indicating elements but in this event the registration shall be obscured and remain obscured until the zero is reached."

Recently, the State of California adopted this specification and it seems probable that other States will do likewise, and it is, therefore, the object of my invention to provide a new and improved construction which will answer requirements in a simple and inexpensive way.

With the foregoing in view, the invention resides in the novel subject matter hereinafter described and claimed, description being accomplished by reference to the accompanying drawings.

Fig. 3 is a vertical transverse section on line 3—3 of Fig. 1, showing the relation of parts from the time the register is reset at zero until the next resetting operation is to be performed.

Fig. 4 is a view similar to Fig. 3 but showing the relation of elements after the next resetting operation has been started, the shutter being shown in the closed position which it occupies throughout the duration of the resetting operation.

Fig. 5 is a view similar to Figs. 3 and 4 but illustrating the manner in which the resetting operation is stopped when it has been fully performed.

Fig. 6 is a perspective view of the pivoted lever which forms an actuator for the shutter and also forms part of the reset stop means.

Fig. 7 is an elevation as indicated by the arrow 7 of Figs. 1 and 2, showing the spring and pin which function to prevent retrograde rotation of the resetting shaft after a resetting operation has been started, the pin being shown in the position which it occupies when the parts at the other end of the register stand as in Fig. 3.

Fig. 8 is a view similar to Fig. 7 but showing the pin after it has snapped from engagement with the spring.

A preferred construction has been illustrated and will be rather specifically described, with the understanding, however, that variations may be made within the scope of the invention as claimed. Moreover, while the invention is embodied in a register known as a "Horizontal 45° Reset Counter", it is to be understood that it may be embodied in registers of other forms.

Figure 1:
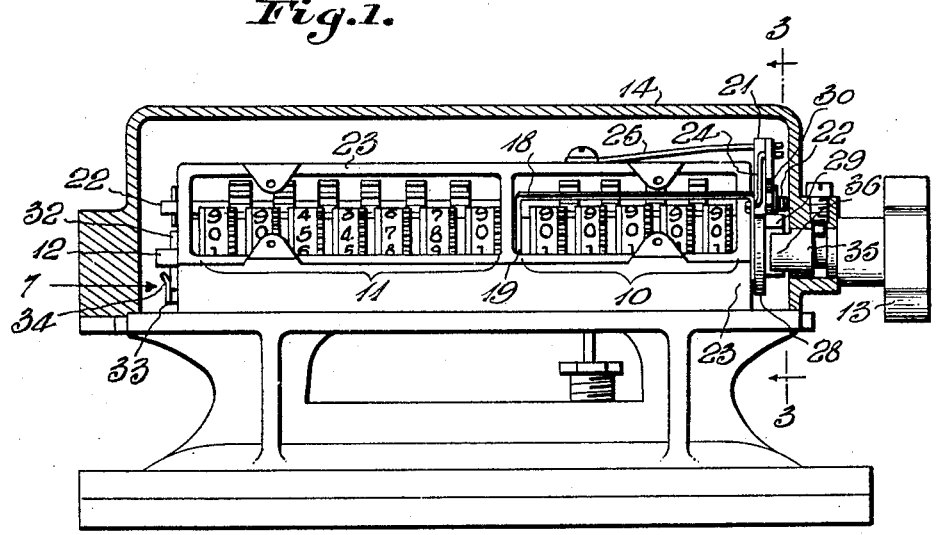
Fig. 1 is a front elevation partly in section showing a register constructed in accordance with the present invention mounted upon the top of a meter, the face plate of the register being removed to more clearly show the shutter which is provided to obscure the register reading during resetting to zero.
Figure 2:
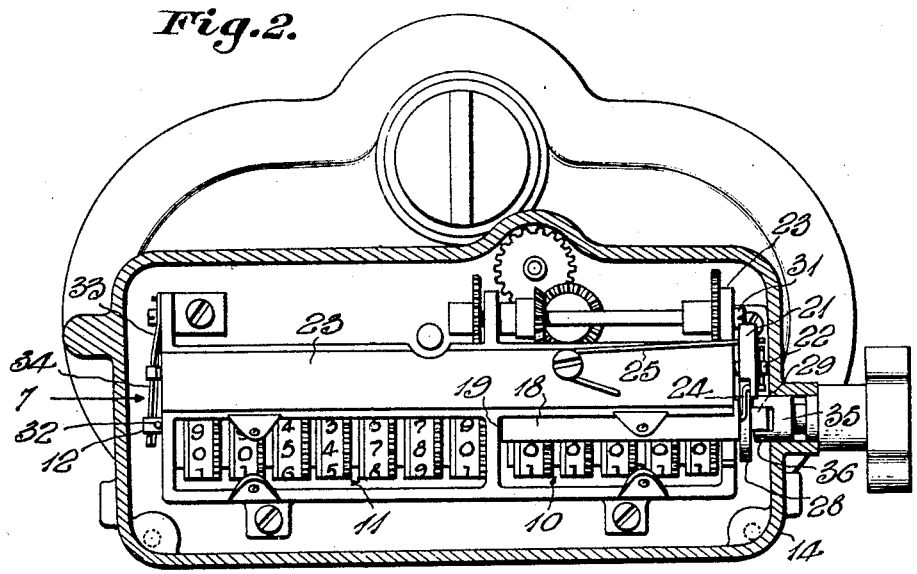
Fig. 2 is a top plan view partly broken away and in horizontal section.
Figure 9:
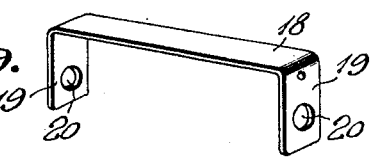
Fig. 9 is a perspective view of the shutter.

The register illustrated in the drawings includes one set of numeral wheels 10 for registering the number of gallons dispensed at any one operation, and also includes a series of numeral wheels 11 which disclose the total gallons dispensed during all of the individual dispensing operations which have been registered by the wheels 10. A resetting shaft 12 is provided for the numeral wheels 10, said shaft being co-axial with said wheels and being provided with an operating knob 13 at the exterior of the register casing 14. This register casing is provided with a transparent window 15 through which the register face-plate 16 (removed in Figs. 1 and 2) may be viewed, the numeral wheels 10 being readable through a slot 17 in said face-plate. A similar slot is, of course, provided through which to read the numeral wheels 11 but as the invention relates to resetting the wheels 10, the wheels 11 will be hereinafter disregarded.

A shutter 18 is provided to close the slot 17 and obscure the register reading during resetting to zero, said shutter being preferably in the form of a narrow metal strip with its ends bent laterally to provide carrying arms 19, said arms having openings 20 through which the resetting shaft 12 passes loosely, to pivotally mount said shutter.

An actuator 21 is provided for the shutter 18, said actuator being in the form of a lever disposed at one side of the shaft 12 and fulcrumed on an axis parallel with said shaft. One end of the transfer shaft 22 of the register may well project beyond one end of the register frame 23 and serve as a fulcrum for the actuator 21. A link 24 connects the actuator 21 with one of the arms 19 of the shutter 18 and a spring 25 (Figs. 1 and 2) is connected with said actuator 21 and holds it normally in the shutter-open position disclosed in Fig. 3. When the actuator 21 is in this position, a cam tooth 26, on the edge of said actuator toward the shaft 12, is received in a notch 27 in a disk 28 which is secured to said shaft 12. As soon as this shaft is turned in resetting direction, however, as indicated by the arrow in Figs. 3, 4 and 5, the disk 28 forces the tooth 26 out of the notch 27, thereby moving the shutter-actuator 21 to the position shown in Fig. 4, causing closing of the shutter 18. This closing occurs as soon as the resetting operation starts, and the peripheral edge of the disk 28 abuts the tooth 26 throughout the resetting operation so that the shutter is held closed until the numeral wheels 10 are fully reset to zero position. When this occurs, the tooth 26 may again drop into the notch 27 with the result that the spring 25 swings the actuator 21 back to its original position and opens the shutter 18.

Novel provision is made to prevent rotation of the resetting shaft 12 beyond zero position and without such provision, there would be danger of the operator accidentally turning said shaft somewhat beyond said position with the result that the shutter 18 would open but would again immediately close, making it necessary to repeat the resetting operation.

A reset stop 29 is secured upon the shaft 12, being preferably pinned both to said shaft and to the disk 28. Another reset stop 30 is provided in the form of a tooth on the inner edge of the shutter-actuator 21. Normally this tooth 30 is in an inactive position spaced from the reset stop 29, as shown in Fig. 3. However, as soon as the resetting operation is started, swinging of the actuator 21 to the position of Fig. 4, so moves the tooth or stop 30 as to dispose it in the path of rotation of the shaft-carried stop 29. Consequently, when the shaft 12 has been rotated far enough to reset the numeral wheels 10 at zero, the reset stop 29 strikes the reset tooth or stop 30 as seen in Fig. 5, thus stopping the resetting operation. As long as the knob 13 is held, after its resetting motion has been stopped, the parts will remain in the position shown in Fig. 5, but as soon as said knob is released, the spring 25 restores the actuator 21 to its normal position with the tooth 26 in the notch 27. This return movement of the actuator 21 opens the shutter 18 and during such return movement, the reset stop or tooth 30 presses against the reset stop 29, retrogradely turning the shaft 12 to a slight extent and almost entirely restoring the disk 28 and reset stop 29 to the position of Fig. 3, the final restoring movement of these parts 28 and 29 to said position being effected by the pressure of the tooth 26 against the edge of the notch 27 as will be clear from said Fig. 3.

A stop 31 which may well be in the form of a screw threaded into one end of the frame 23, has been shown to prevent movement of the actuator 21 under pressure of the reset stop 29 against the reset stop 30, in case further turning stress should be imparted to the knob 13 after said stops abut each other.

A pin 32 passes through the end of the reset shaft 12 opposite the knob-engaging end of said shaft, said pin projecting in opposite directions from said shaft and being cooperable with a flat spring 33 secured against one end of the frame 23 to prevent retrograde rotation of said shaft 12 after the resetting operation has been started. The upper edge of the spring 33 is curved laterally at 34 to allow the pin 32 to crowd said spring out of its path as the shaft 12 is turned in the proper direction to reset the register. However, if an attempt be made to retrogradely rotate said shaft, one end or the other of the pin strikes the free end of the spring 33 as will be clear from Fig. 8. The pin and spring thus function to prevent partial resetting and then turning the knob 13 backward to the original position, thus re-opening the shutter when the numeral wheels 10 are not set at zero position. When the shaft 12 has been turned to the extent illustrated in Fig. 5, the lower end of the pin 32 still remains between the spring 33 and the frame 23 so that upon release of the knob 13 and return of the actuator 21 to its normal position, said shaft may retrogradely turn sufficiently to re-occupy the position shown in Fig. 3. As soon as a resetting operation has been started, however, the pin 32 and the spring 33 perform the required function.

When the register is reset at zero and in fact, up to the time the wheels 10 are to be reset, the parts stand as shown in Fig. 3 with the shutter 18 open, the tooth 26 of the actuator 21, in the notch 27, and the reset stop 30 of said actuator in an inactive position spaced from the reset stop 29. During the resetting operation, effected by rotating the shaft 12, the parts assume the positions shown in Fig. 4, the shutter 18 being closed and the reset stop 30 being set in position to be struck by the reset stop 29 of the shaft, at completion of the resetting operation. By the time the numeral wheels have reached their zero setting, stop 29 has struck the stop 30 as in Fig. 5, limiting the resetting rotation of said shaft, and upon release of the knob 13, the parts return to normal under the influence of the spring 25.

In the present disclosure, the knob 13 is provided with a spindle 35 having two lugs 36 on its inner end which straddle the reset stop 29 to establish a driving connection between said knob and the resetting shaft 12. As a matter of convenience, this construction is preferably followed, but it is obvious that any other operating connection could be employed between said knob and shaft.

From the foregoing, taken in connection with the accompanying drawings, it will be seen that novel and advantageous provision has been made for attaining the desired end, and attention is again invited to the possibility of making variations within the scope of the invention as claimed.

I claim:—

1. In a register having numeral wheels, and a resetting shaft therefor; a shutter normally biased toward open position for obscuring the register reading during resetting, a single lever connected with said shutter, said lever being disposed at one side of said shaft and fulcrumed on an axis parallel with said shaft, the edge of said lever toward said shaft being provided with a cam tooth and with a reset stop tooth, both of said teeth being fixedly connected to said lever, a disk secured to said shaft and having a peripheral notch in which said cam tooth of said lever is normally received, whereby upon initial resetting rotation of said shaft, one side of said notch will force said cam tooth from said notch and thereby swing said lever to shutter-closed position, and a reset stop on said shaft positioned to strike said reset stop tooth of said lever to stop the resetting rotation of the shaft at the completion of the resetting operation, said notch being in position at said completion of the resetting operation to again receive said cam tooth and therefore allow return of said lever to shutter-open position, said reset stop tooth being moved out of contact with the shaft-carried reset stop by said lever when said lever returns to said shutter-open position.

2. In a register having numeral wheels, and a resetting shaft for said numeral wheels disposed coaxially therewith; a shutter biased toward open position for obscuring the register reading during resetting, said shutter having carrying arms pivotally mounted on said shaft, a single lever at one side of said shaft and fulcrumed on an axis parallel with said shaft, a single link directly connecting said lever with one of said shutter-carrying arms, the edge of said lever toward said shaft being provided with a cam tooth fixedly connected to the lever, and a disk secured on said shaft, said disk having a notch in which said cam tooth is normally received, one side of said notch being cooperable with said cam tooth of said lever upon initial resetting rotation of said shaft to force said cam tooth out of said notch and thereby swing said lever to shutter-closed position, said notch being in position at the completion of the resetting rotation of said shaft to again receive said cam tooth and to therefore allow return of said lever to shutter-open position.

3. In a register having numeral wheels and a resetting shaft therefor; a single lever at one side of said shaft and fulcrumed on an axis parallel with said shaft, the edge of said lever toward said shaft being provided with a cam tooth and with a reset stop tooth, both of said teeth being fixedly connected to the lever, a disk secured to said shaft and having a peripheral notch in which said cam tooth of said lever is normally received, whereby upon initial resetting rotation of said shaft one side of said notch will force said cam tooth of said lever out of said notch and thereby swing said lever to move said reset stop tooth of said lever into position for operation, a reset stop on said shaft positioned to strike said reset stop tooth at the completion of the resetting operation, said notch being then again in position to receive said cam tooth to allow return of said lever to its normal position, and means for returning said lever to said normal position, said reset stop tooth of said lever being moved out of contact with said reset stop by said lever when the latter returns to said normal position.

ARMAS J. SAARINEN.